US008826004B2

(12) United States Patent
Euchner et al.

(10) Patent No.: US 8,826,004 B2
(45) Date of Patent: Sep. 2, 2014

(54) METHOD AND SYSTEM FOR PRINTING TRANSACTION DOCUMENTS USING A MULTI-VENDOR SECURE PRINTER UNDER CONTROL OF A PRINTER AUTHORITY

(75) Inventors: James A. Euchner, Waccabuc, NY (US); Robert A. Cordery, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 3415 days.

(21) Appl. No.: 10/946,934

(22) Filed: Sep. 22, 2004

(65) Prior Publication Data

US 2006/0064580 A1 Mar. 23, 2006

(51) Int. Cl.
*H04L 9/00* (2006.01)

(52) U.S. Cl.
USPC ............ 713/156; 713/155; 713/176; 713/186

(58) Field of Classification Search
USPC .......................................... 713/175
See application file for complete search history.

(56) References Cited

U.S. PATENT DOCUMENTS

| 4,253,158 | A | 2/1981 | McFiggans |
| 6,064,989 | A | 5/2000 | Cordery et al. |
| 6,064,993 | A | 5/2000 | Ryan, Jr. |
| D434,094 | S | 11/2000 | Miyashita ............... D21/744 |
| 6,373,587 | B1 | 4/2002 | Sansone |
| 6,385,728 | B1 * | 5/2002 | DeBry ........................ 726/9 |
| 6,663,496 | B2 | 12/2003 | Cameron et al. .......... 473/220 |
| 6,711,677 | B1 * | 3/2004 | Wiegley .................... 713/151 |
| 6,789,194 | B1 * | 9/2004 | Lapstun et al. ............ 713/176 |
| 6,918,042 | B1 * | 7/2005 | Debry ......................... 726/5 |
| 7,296,157 | B2 * | 11/2007 | Partelow et al. ........... 713/171 |
| 7,305,550 | B2 * | 12/2007 | Oliver et al. .............. 713/156 |
| 7,389,414 | B2 * | 6/2008 | Hibino et al. ............. 713/161 |
| 2002/0010784 | A1 * | 1/2002 | Clayton et al. ........... 709/229 |
| 2002/0012133 | A1 * | 1/2002 | Haruna et al. ............ 358/1.15 |
| 2002/0184519 | A1 * | 12/2002 | Wadley ..................... 713/200 |
| 2003/0099353 | A1 * | 5/2003 | Goh et al. ................... 380/51 |
| 2003/0126432 | A1 * | 7/2003 | Tonisson .................. 713/156 |
| 2003/0182549 | A1 * | 9/2003 | Hallin et al. ............. 713/156 |

(Continued)

OTHER PUBLICATIONS

FIPS PUB 140-2 Federal Information Processing Standards Publication—Security Requirements for Cryptographic Modules, Issued May 25, 2001.
ITU-T X.509 Series X: Data Networks and Open System Communications Directory, Mar. 2000.

*Primary Examiner* — Kambiz Zand
*Assistant Examiner* — Yonas Bayou
(74) *Attorney, Agent, or Firm* — Brian A. Lemm; Charles R. Malandra, Jr.; Steven J. Shapiro

(57) ABSTRACT

A low-cost, network based, secure printer that can provide multiple vendors with independent protected access, as authorized by a secure printer authority, is provided. The secure printer authority issues certificates for each secure printer and authorized vendor. Each certificate includes a public key and identification for the respective secure printer or vendor. The certificates are utilized during generation of a secret session key that preferably can be utilized only once to print the requested document. The secret session key is used by the vendor to encrypt the document, and used by the printer to decrypt the document. Since the secret session key is preferably valid for only a single document, printing of the document can only occur once, thereby preventing any fraudulent printing of the document. Additionally, only vendors authorized by the secure printer authority will have the ability to establish session keys with the printer.

29 Claims, 4 Drawing Sheets

(56) References Cited

U.S. PATENT DOCUMENTS

| | | | |
|---|---|---|---|
| 2004/0010682 A1* | 1/2004 | Foster et al. | 713/156 |
| 2004/0054913 A1* | 3/2004 | West | 713/186 |
| 2004/0102254 A1 | 5/2004 | Mills | 473/244 |
| 2004/0123100 A1* | 6/2004 | Noyama et al. | 713/159 |
| 2005/0138065 A1* | 6/2005 | Ciriza | 707/104.1 |
| 2006/0165456 A1* | 7/2006 | Matsunaga et al. | 400/62 |
| 2007/0186278 A1* | 8/2007 | Fujii et al. | 726/5 |

* cited by examiner

METHOD AND SYSTEM FOR PRINTING TRANSACTION DOCUMENTS USING A MULTI-VENDOR SECURE PRINTER UNDER CONTROL OF A PRINTER AUTHORITY

FIELD OF THE INVENTION

The invention disclosed herein relates generally to securely printing value documents related to transactions, and more particularly to a method and system for securely printing transaction documents issued by multiple vendors using a secure printer under control of a printer authority.

BACKGROUND OF THE INVENTION

The proliferation of communication networks, e.g., the Internet, has enabled customers to perform transactions with vendors from any location where the customer has access to a computer coupled to a communication network. Such transactions have also allowed the vendors to shift the performance of tasks previously required of the vendor (or an authorized agent thereof) to customers. One such task includes, for example, the printing of value documents to evidence that a transaction has occurred. Such documents could include, for example, event tickets, e.g., sporting events, movies, concerts, shows, etc., lottery tickets, airline tickets, receipts, gift certificates, or magazine articles or other literature for which only one print has been authorized. These documents typically have a substantial, intrinsic value that may be presented by any bearer to gain admittance or exercise an entitlement. Since such documents may have substantial cash value, there exists a continuing problem of preventing the printing of fraudulent documents.

As noted above, some vendors give their customers the option of printing such documents at home using ordinary paper, a personal computer printer and an Internet connection. One problem with this situation is preventing the printing of counterfeit documents by reprinting a document previously printed (referred to as a replay attack) or printing the same document simultaneously on multiple printers (referred to as a parallel attack). Each of these situations can result in the printing of fraudulent documents, for which the vendor has not been properly compensated.

Thus, there exists a need for improving the security of the printing process of documents evidencing a transaction to prevent the printing of fraudulent documents.

SUMMARY OF THE INVENTION

The present invention alleviates the problems associated with the prior art and provides a method and system that improves the security of the printing process of value documents. The present invention provides a low-cost, network based, secure printer that can provide multiple vendors with independent protected access, as authorized by a printer authority.

According to embodiments of the invention, customers are provided with a secure printer that has limited access to at least one mode of the printer controlled by a printer authority. The printer authority issues secure printer certificates for each secure printer and authorized vendor certificates to vendors authorized to provide documents for printing to the secure printers. Each secure printer certificate includes the printer's public key of a public/private key pair, generated by the printer, and identification information for the printer. Each authorized vendor certificate includes the vendor's public key of a public/private key pair, generated by the vendor, and identification information for the vendor.

The customer communicates with the vendor, utilizing, for example, a computer coupled to the secure printer and a network connection, to conduct a transaction. When the transaction results in the customer desiring to print a value document in the secure printer mode, a request is sent to the vendor that includes an identification of the printer coupled to the customer's computer. The vendor can obtain and verify the certificate for the printer issued by the printer authority. The vendor will then issue a request for printing to the printer, which in response to the request will send a "challenge" to the vendor. The challenge could be, for example, a random or sequential number that must be included in any subsequent messages being returned from the vendor. Alternatively, the challenge and the printer identification can be included in the initial request to the vendor, thus reducing the communication protocol by one round. The printer and vendor will then execute a secret key exchange to generate a session key that preferably can be utilized only once to print the requested document. Preferably, the vendor certificate and the vendor private key are utilized during the key exchange to authenticate the vendor to the printer. Additionally, the printer certificate and the printer private key are preferably utilized during the key exchange to authenticate the printer to the vendor. The secret key is used by the vendor to encrypt the value document, and the encrypted value document is sent by the vendor to the printer. The encrypted value document may or may not be signed by the vendor using the vendor's private key.

If the encrypted document is signed, the printer will verify the signature using the vendor's public key included in the certificate issued by the printer authority for the vendor. Once the signature has been verified, or if the encrypted value document is not signed, the printer can decrypt the value document using the secret key and can then print the value document. Since the session key is preferably valid for only a single document and the printer is a secure printer, printing of the value document can only occur once, thereby preventing any fraudulent printing of the value document. Additionally, only vendors authorized by the printer authority will have the ability to establish session keys with the printer, thereby preventing fraudulent use of the printer by unauthorized parties.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PREFERRED EMBODIMENTS

Figure 1:
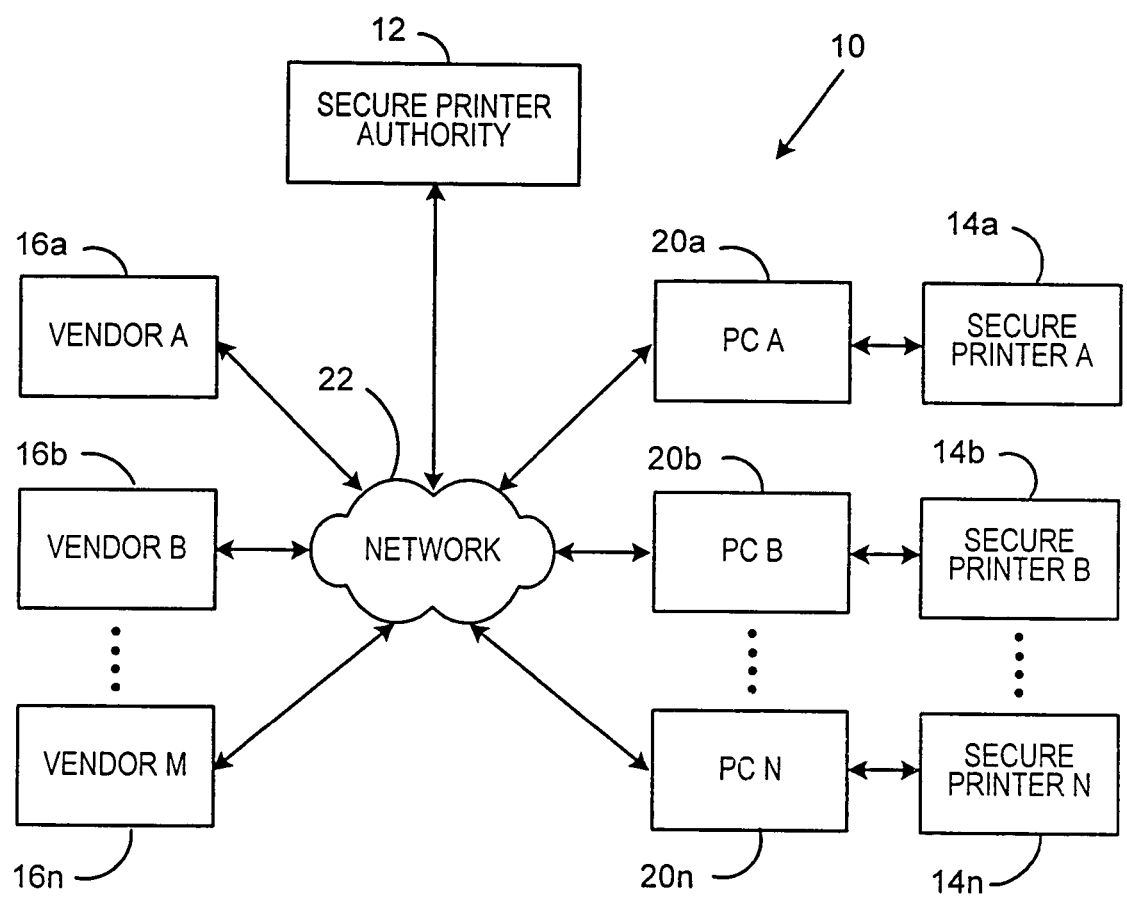
FIG. 1 illustrates in block diagram form a multi-vendor secure printing system according to an embodiment of the present invention.

In describing the present invention, reference is made to the drawings, where there is seen in FIG. 1 in block diagram form a multi-vendor secure printing system 10 according to an embodiment of the present invention. System 10 includes one or more secure printers 14a-14n, one or more service vendors 16a-16m and a printer authority 12 that enables documents generated by the vendors 16a-16m to be securely printed by one of the secure printers 14a-14n. The printer authority 12 controls access to the secure printers 14a-14n utilizing certificates issued to the vendors 16a-16m and the secure printers 14a-14n as described below. The vendors 16a-16m are parties that authorize transactions that require secure printing of documents or images, such as, for example, event tickets, e.g., sporting events, movies, concerts, shows, etc., lottery tickets, airline tickets, receipts, gift certificates, articles or other literature, etc. The documents preferably include an identification of the authorizing vendor, including, for example, a logo or symbol associated with the vendor, steganographic information associated with the vendor, or a cryptographic authentication code produced by the vendor. The document also preferably includes an identification of the secure printer used to print the document, such as, for example, an identification or serial number of secure printer and/or a cryptographic authentication code encoded in the document as steganographic, bar code or human-readable information. It should be understood that while there are three vendors 16a-16m and three secure printers 14a-14n illustrated in FIG. 1, the invention is not so limited and any number of vendors and/or printers can be included.

Each of the secure printers 14a-14n is a printer system with limited access to at least one mode of the printer, referred to as the printer secure mode, controlled by the printer authority 12. In the following description, requests to print a document imply a request to print in the printer secure mode. The secure printers 14a-14n may or may not be manufactured by the printer authority 12. The secure printers 14a-14n could be, for example, a print head with an attached cryptographic coprocessor that controls access to the print head. The secure print head may be a fixed or removable component of a specialized stand-alone device, such as, for example, a postage meter, or may be a substitute component for a standard office printer such as an ink jet printer. The printer preferably includes one or more features to ensure the security of the printer. Such features could include, for example, a cryptographic secret that is required to operate the printer, mechanisms to authenticate the source of a print command, and mechanisms for the printer to be authenticated by the source of a print command. Such features could also include, for example, mechanisms to authenticate the operator of the printer using, for example, cryptographic means, passwords, biometrics, presence of smart card of any combination of these, mechanisms to decrypt encrypted print commands such that image data cannot be captured when it is being sent to the printer, and mechanisms to issue cryptographic challenges or other methods of preventing the printing of duplicate documents. The printers 14a-14n also preferably include some type of physical security to prevent physical access to the internal control mechanisms, memory, or cryptographic engines. The printer physical security can be accomplished, for example, by methods such as those described in the Federal Information Processing Standards publication "Security Requirements for Cryptographic Modules," FIPS PUB 140-2. The printers 14a-14n can also include features that make reproducing a document printed by the printer more difficult. For example, the printers 14a-14n could generate images with forensic features that make producing a duplicate more difficult, including, for example, pseudo-randomly placed pixels, modification of pixel position and utilization of ink with special properties such as, for example, fluorescence.

The printers 14a-14n may be coupled to a processing system, such as, for example, personal computers 20a-20n, respectively, to form a workstation. The personal computers 20a-20n include communication means, such as a modem or the like, that allow a user to communicate with the vendors 16a-16m and the printer authority 12 via a network 22, such as, for example, the Internet. Alternatively, the secure printers 14a-14n and functionality of the personal computers 20a-20n may be incorporated into a single device. Each of the workstations (including the PC's 20a-20n and respective secure printers 14a-14n or single, integrated devices) can be located, for example, in personal homes, at retail locations, in airports, hotels, restaurants, movie theaters or any other type of location as desired. Communications between the printers 14a-14n and the vendors 16a-16m are preferably performed using a secure communication channel that provides at least one of the following features to the parties involved in the communication, e.g., printers 14a-14n and vendors 16a-16m: (i) assurance that no party other than the communicating parties can create a message transmitted in the communication; (ii) assurance that no party other than the communicating parties can read a message transmitted in the communication; (iii) assurance as to the identity of the other party to the communication; or (iv) assurance that a message was created by the other party for use in this round of communication. As will be described further below, utilizing the application of present invention in conjunction with a network layer, such as, for example, Secure Socket Layer (SSL) protocol, allows a secure communication channel to be established in which a printer can verify that a document comes from an authorized vendor and that the printer is authorized to print the document for this round of communication, and also allows a vendor to verify that only an authorized printer will print the document.

Figure 2:
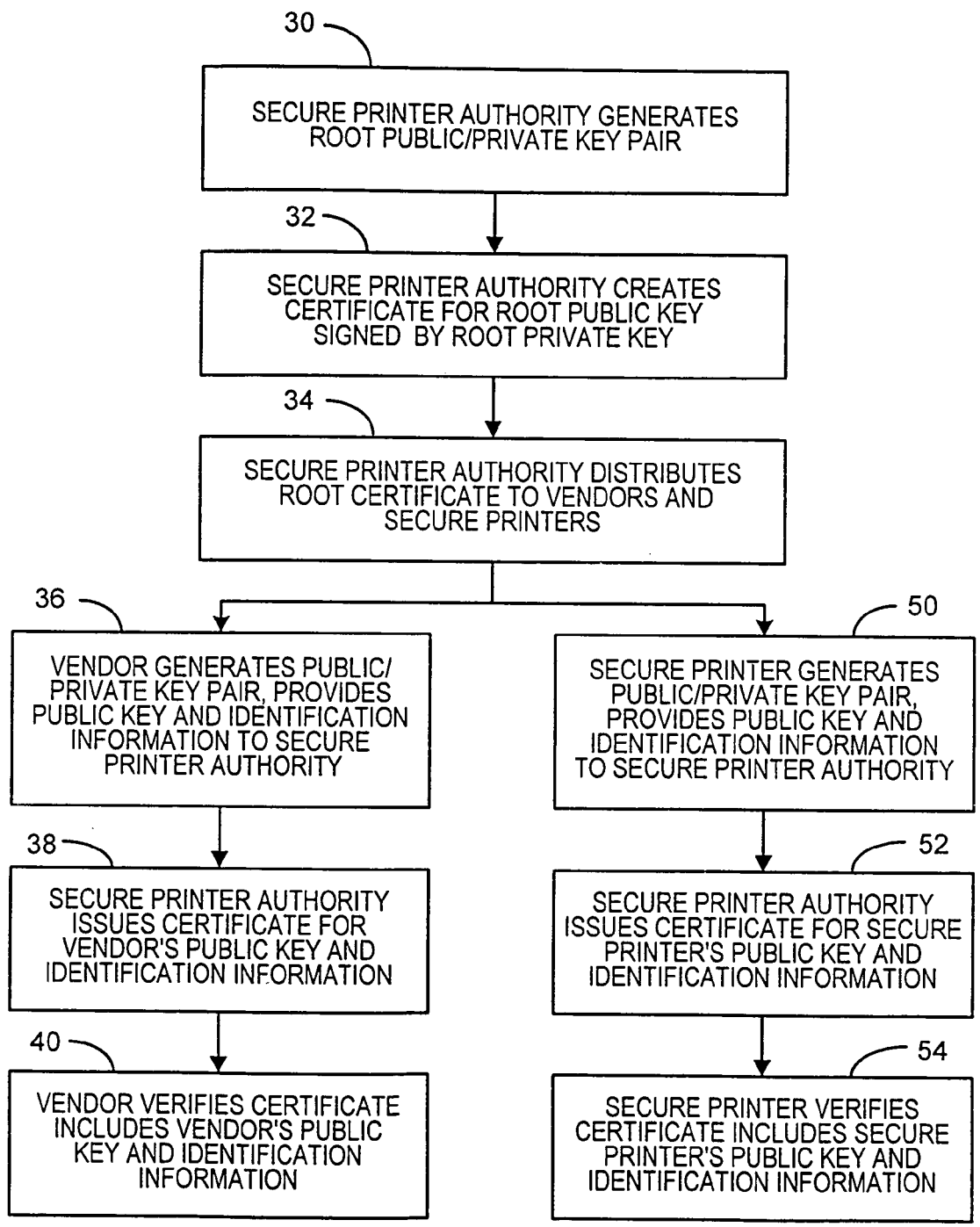
FIG. 2 illustrates in flow diagram form processing performed during initialization of the system illustrated in FIG. 1 according to an embodiment of the invention.

Referring now to FIG. 2, there is illustrated in flow diagram form processing performed during initialization of the system illustrated in FIG. 1 according to an embodiment of the invention. In step 30, the printer authority 12 generates a root public/private cryptographic key pair. The generation of the root public/private key pair can be done utilizing any method for cryptographic key generation as is known in the art. In step 32, the printer authority 12 creates a certificate for the root public key, and signs the certificate using the root private key. In step 34, the printer authority distributes the root certificate created in step 32 to vendors 16a-16m that wish to utilize the system 10 and to secure printers 14a-14n that will be utilized in the system 10. Such distribution is preferably done securely, such as, for example, manually, by mail, or based on some proof of identity such as knowledge of a credit card number. The level of effort used to ensure that the correct party receives a certificate depends on the security needs of the application, and in particular the application' identification and authentication policy. The root certificate provides security for communications between the vendors 16a-16m and printer authority 12 and the secure printers 14a-14n and printer authority 12 by enabling verification and authentication of the communications.

The printer authority 12 will then initialize each vendor 16a-16m that desires to utilize the system 10 to have generated documents securely printed, as well as each secure printer 14a-14n that can be used to print such documents. If a vendor, such as, for example, vendor 16a, desires to utilize the system 10, the vendor 16a contacts the printer authority 12 to obtain the printer authority's 12 root certificate as described above in step 34. In step 36, the vendor 16a will generate a public/private key pair and provides the public key and identification information for vendor 16a to the printer authority 12. The generation of the public/private key pair can be done by any key generation method as is known in the art. In step 38, the printer authority 12 issues a certificate for vendor's 16 public key and identification information, and signs the certificate with the printer authority's 12 private key. Thus, the accuracy of the vendor's 16 public key and identification information can be established by verifying the signature of the certificate containing these items using the printer authority's 12 public key. Since the printer authority 12 is a trusted party, the information contained within certificates issued by the printer authority 12 can be deemed as trustworthy. In step 40, the vendor 16a can optionally verify the certificate issued by the printer authority 12 to ensure that the vendor's 16a public key and identification information as contained within the certificate are both correct. The vendor 16a can now utilize a secure printer 14a-4n of the system 10 to print documents as will be described below. It should be understood that the processing as described with respect to steps 3640 will occur for each vendor that desires to utilize the system 10, and that any number of vendors can be added to the system 10 at any time.

The printer authority 12 will also initialize each secure printer 14a-14n to be used within the system 10. Such initialization can occur during manufacturing of the printer, or after the printer has been installed in the field. Suppose, for example that secure printer 14a is to be initialized for use in the system 10. As noted above in step 34, the printer authority 12 distributes its root certificate to secure printer 14a. Such distribution can occur, for example, during manufacturing where the certificate can be downloaded directly into the secure printer 14a. The distribution can also occur after the secure printer 14a has been manufactured by downloading the root certificate via the network 22. In step 50, the secure printer 14a will generate a public/private key pair and provide the public key, along with identification information that identifies the secure printer 14a, to the printer authority 12. Such identification information could include, for example, a serial number or the like. The generation of the public/private key pair can be done by any key generation method as is known in the art.

In step 52, the printer authority 12 issues a certificate for secure printer's 14a public key and identification information, and signs the certificate with the printer authority's 12 private key. In step 54, the secure printer 14a can optionally verify the certificate issued by the printer authority 12 to ensure that the secure printer's 14a public key and identification information as contained within the certificate are both correct. The secure printer 14a can now be utilized within system 10 to print documents as will be described below. It should be understood that the processing as described with respect to steps 50-54 will occur for each secure printer that will be utilized within the system 10, and that any number of secure printers can be added to the system 10 at any time.

Figure 3A:
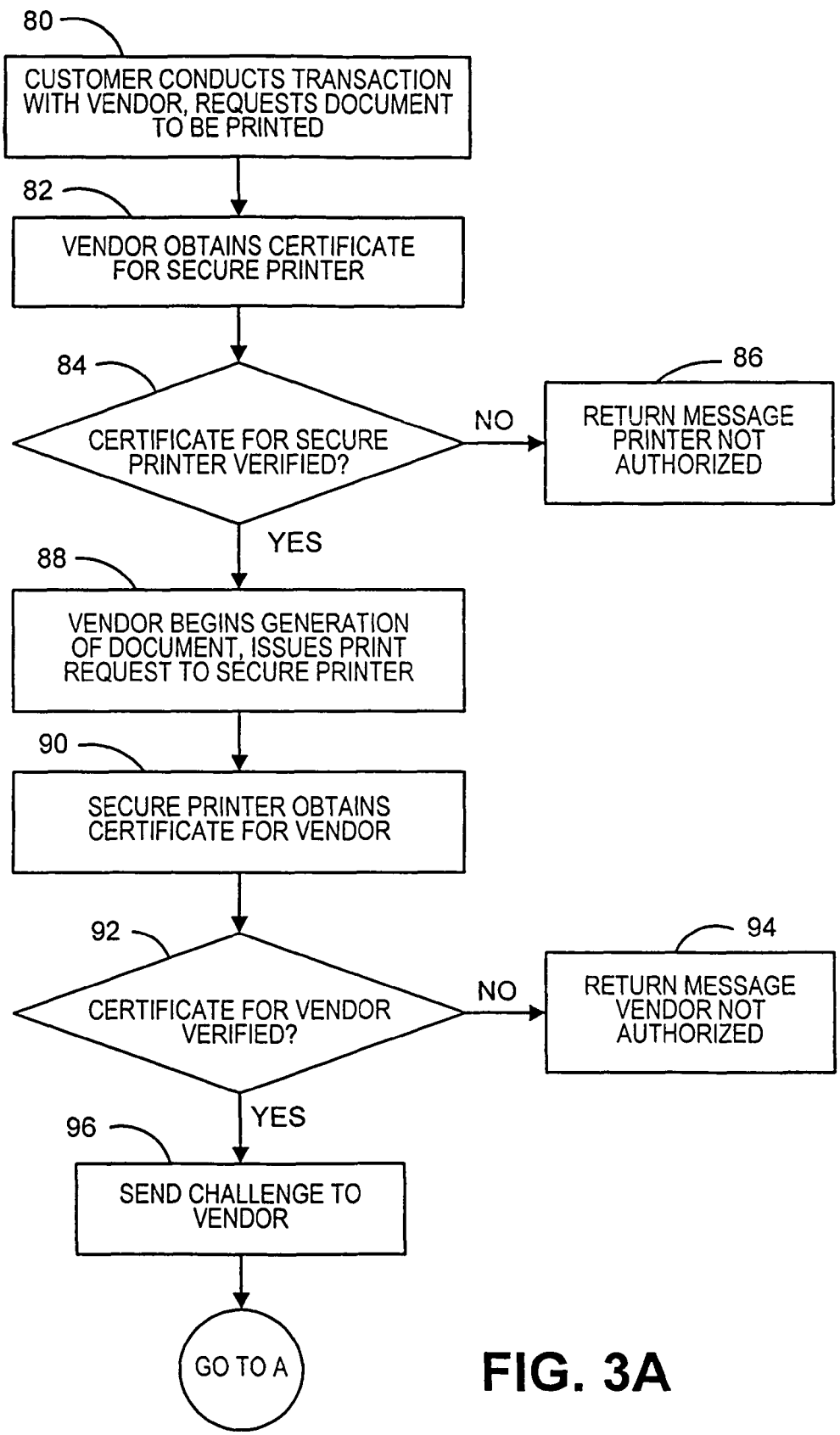
FIGS. 3A and 3B illustrate in flow diagram form processing performed to print a document using the system illustrated in FIG. 1 according to an embodiment of the invention.
Figure 3B:
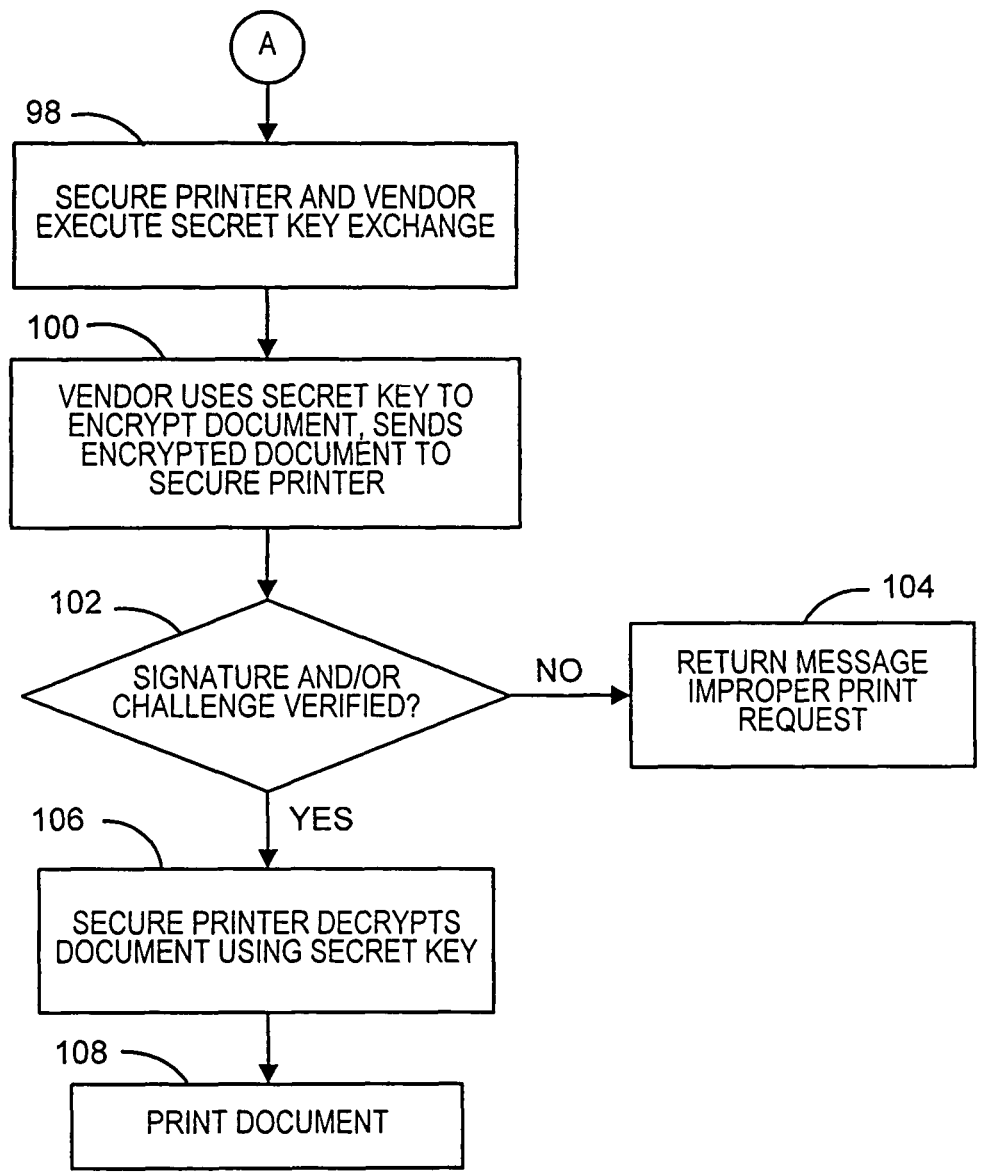

Once the processing as illustrated in FIG. 2 has been performed as described above, the secure printer 14a can be utilized to securely print documents generated by the vendor 16a as illustrated in flow diagram form in FIGS. 3A and 3B. Suppose, for example, a customer desires to conduct a transaction with vendor 16a that results in the printing of a value document to evidence that the transaction has occurred. In step 80, the customer uses the workstation, e.g., personal computer 20a, to conduct the transaction with the vendor 16a via the network 22, including the payment of any fees or authorization to deduct fees from an account of the customer in any manner accepted by the vendor 16a. At the completion of the transaction, the customer sends a request to the vendor 16a to print the document. The request to print the document will include an identification of the secure printer 14a that will be used to print the document. In step 82, the vendor 16a obtains the certificate issued by the printer authority 12 for secure printer 14a. This can be done, for example, by the vendor 16a communicating with the printer authority 12 via the network 22 to obtain the certificate for the identified secure printer 14a from a certificate database maintained by the printer authority 12. Alternatively, the certificate for the secure printer 14a could be included along with the request to print the document.

In step 84, vendor 16a will verify the certificate for the secure printer 14a using the public key from the printer authority 12. If the certificate for the secure printer 14a is not verified, indicating that it was not validly issued by the printer authority 12, then in step 86 the vendor 16a will return a message to the customer indicating that the printer 14a is not an authorized printer for use in the system 10 and that the requested document can not be printed on that printer. Thus, the vendor 16a can ensure that only authorized, secure printers will be used to print the document, thereby significantly decreasing the chance of fraudulent duplicate printing of the document. If the certificate for the secure printer 14a is verified, then in step 88 the vendor 16a will begin to generate the document for printing and issue a print request to the secure printer 14a. In step 90, the secure printer 14a obtains the certificate issued by the printer authority 12 for vendor 16a. This can be done, for example, by the secure printer 14a communicating with the printer authority 12 via the network 22 to obtain the certificate for the identified vendor 16a from a certificate database maintained by the printer authority 12. As another optional security measure, the certificate for the vendor 16a must be accompanied by a message from the printer authority 12 directly authorizing vendor 16a to have documents printed by a secure printer within the system 10. Alternatively, the certificate for the vendor 16a could be included along with the print request sent by the vendor 16a.

In step 92, secure printer 14a will verify the certificate for the vendor 16a using the public key from the printer authority 12, and if required, ensure that the message from the printer authority 12 is also provided. If the certificate for the vendor 16a is not verified, indicating that it was not validly issued by the printer authority 12, or if a required message from the printer authority 12 is not provided, then in step 94 the secure printer 14a will return a message to the customer indicating that the vendor 16a is not an authorized vendor within the system 10 and that the secure printer 14a can not be used to print documents generated by that vendor. Thus, the secure printer 14a will ensure that only documents generated by authorized vendors are printed by the secure printer 14a. If the certificate for the vendor 16a is verified, then in step 96 the secure printer 14a will send a unique "challenge" to the vendor 16a. The challenge could be, for example, a random number generated by the secure printer 14a or a sequential number maintained by the secure printer 14a. The challenge is preferably required to be included in any further communications from the vendor 16a to the secure printer 14a to ensure the freshness of the current communication session as described below.

In step 98, the vendor 16a and the secure printer 14a execute a secret key exchange to generate a secret session key to be used for encryption/decryption during the current communication session. The secret key exchange could be performed, for example, by the vendor 16a generating a secret key, and returning it to the secure printer 14a in a message that includes the challenge from the secure printer 14a. The message could be encrypted with the secure printer's 14a public key and signed using the vendor's 16a private key. The secure printer 14a will retrieve the secret key from the message by verifying the signature of the message using the vendor's 16a public key, obtained from the certificate issued by the printer authority 12 (thereby ensuring the message is actually from the vendor 16a), and decrypting the message using the secure printer's 14a private key. The secure printer 14a can then verify the challenge in the message, and if the challenge verifies, the secure printer 14a will accept the secret key in the message for use as described below. Alternatively, the secret key exchange could be performed by the secure printer 14a generating a secret key and sending it to the vendor 16a in a message encrypted with the vendor's 16a public key and signed with the secure printer's 14a private key. The vendor 16a will retrieve the secret key from the message by verifying the signature of the message using the secure printer's 14a public key, obtained from the certificate issued by the printer authority 12 (thereby ensuring the message is actually from the secure printer 14a), and decrypting the message using the vendor's 16a private key. Upon verification and decryption, the vendor 16a will accept the secret key in the message for use as described below. As another alternative, the secret key exchange could be performed by both the vendor 16a and secure printer 14a participating in the generation of the secret key, such as, for example, utilizing an authenticated Diffie-Helman key exchange as is known in the art. With this method, the public keys included in the certificates issued by the printer authority 12 are utilized by both the vendor 16a and secure printer 14 to sign messages sent to the other, thereby ensuring authenticity of the communications. The communication protocol used during the secret key exchange could be, for example, server and client side authenticated Secure Socket Layer (SSL) protocol.

Once the secret key exchange has occurred, then in step 100 the vendor 16a will use the secret key to encrypt the document that has been prepared for printing, and send the encrypted document to the secure printer 14a. The message including the encrypted document may or may not be signed using the vendor's 16a private key. For additional security, the vendor 16a preferably includes the challenge in the message to the secure printer 14a. The challenge may or may not be encrypted using the secret key. If the challenge is encrypted, the secure printer 14a will use the secret key to decrypt the message and in step 102 verify the challenge. The challenge must match the challenge sent in step 96 to the vendor 16a to ensure the freshness of the communications, i.e., that the message received is not an attempt to reprint a document by replaying a message previously sent. Thus, for example, if a previous communication from the vendor 16a is attempted to be replayed, such as, for example, if a customer is attempting to reprint a document on the secure printer 14a, the secure printer 14a can determine that the challenge has already been used and will not print the document. This provides further safeguards to prevent the fraudulent duplicate printing of documents using the secure printer 14a (or any other printer in the system 10). If the challenge or signature of the message (if signed) is not verified in step 102, then in step 104 the secure printer 14a will return an error message to the customer indicating an improper print request has been made and the document included in the message will not be printed. It should be noted that the challenge need not be provided with the encrypted document, since the secret session key is preferably utilized by the secure printer 14a only once. Thus, any attempted replay of a message encrypted using a secret session key previously utilized will result in the secure printer 14a being unable to decrypt the message, and thus unable to print the document within the message.

Once the challenge (if provided) has been verified, then in step 106 the secure printer 14a will utilize the secret key generated for this communication session to decrypt the document sent from the vendor 16a, and in step 108 the secure printer 14a can print the document. As noted above, the secret session key is preferably a single use key, and thus after the document has been decrypted the secret session key used to decrypt the document is erased by the secure printer 14a.

Thus, according to the present invention, a method and system that improves the security of the printing process of value documents is provided in the form of a low-cost, network based, secure printer that can provide multiple vendors with independent protected access, as authorized by a printer authority. Access to the secure printers is controlled by the distribution of certificates issued by the printer authority for authorized vendors and printers. Vendors can control and authenticate which printer prints value documents generated by the vendors using the certificate issued to the printer. The printer authority can authorize new vendors and printers by issuing new certificates. The private keys and the associated public keys and certificates can be periodically updated using known public key infrastructure methods, such as, for example, those described in "ITU-T X.509: Series X: Data Networks and Open System Communications Directory." Additionally, the printers prevent the unauthorized duplicate printing of value documents. Those skilled in the art will also recognize that various modifications can be made without departing from the spirit of the present invention. For example, printer authority 12 could be provided with additional control over printing of documents authorized by the vendors 16a-16m by having the printer authority 12 generate the documents for printing, based on artwork and/or validation codes provided by the vendor's 16a-16m. The printer authority 12 could also provide accounting services that allows the customers to pay for transactions with the vendor's 16a-16m utilizing a pre-established account with the printer authority 12. As another example, the printer authority 12 could provide verification services for the documents printed by the secure printer's 14a-14n. When the printed document, such as, for example, an event ticket, is taken by the customer to the point of service, i.e., entry into the event, the ticket can be scanned and the information printed on the ticket sent to the printer authority 12. The printer authority 12 can then verify the information from the ticket to determine if the ticket is authentic, a forged document, or an unauthorized duplicate.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. In a printing system including a secure printer and a printer authority to control access to the secure printer, a method for printing a document, generated by a vendor, using the secure printer, the method comprising:
- receiving, at the vendor, a request via a network to print the document from a workstation associated with the secure printer, the request including an identification of the secure printer;
- obtaining, by the vendor, a certificate issued by the printer authority for the secure printer based on the identification of the secure printer included in the request to print the document;
- verifying, by the vendor, the certificate issued by the printer authority for the secure printer;
- if the certificate for the secure printer verifies, issuing a print request from the vendor to the secure printer via the network;
- obtaining, by the secure printer, a certificate issued by the printer authority for the vendor in response to the print request issued from the vendor;
- verifying, by the secure printer, the certificate issued by the printer authority for the vendor;
- if the certificate for the vendor verifies, creating a secure communication channel between the secure printer and the vendor;
- sending the document to the secure printer via the secure communication channel; and
- printing the document at the secure printer.

2. The method of claim 1, wherein creating a secure communication channel further comprises:
- executing a secret key exchange between the vendor and the secure printer to generate a secret session key.

3. The method of claim 2, wherein sending the document to the secure printer via the secure communication channel further comprises:
- using the secret session key at the vendor to encrypt the document; and
- sending the encrypted document from the vendor to the secure printer via the secure communication channel.

4. The method of claim 3, wherein printing the document at the secure printer further comprises:
- using the secret session key at the secure printer to decrypt the document.

5. The method of claim 2, wherein the certificate issued by the printer authority for the vendor includes a public key of a public/private key pair generated by the vendor, and executing a secret key exchange further comprises:
- generating a secret key at the vendor; and
- providing the generated secret key to the secure printer in a message signed using the private key of the public/private key pair generated by the vendor.

6. The method of claim 2, wherein the certificate issued by the printer authority for the secure printer includes a public key of a public/private key pair generated by the secure printer, and executing a secret key exchange further comprises:
- generating a secret key at the secure printer; and
- providing the generated secret key to the vendor in a message signed using the private key of the public/private key pair generated by the secure printer.

7. The method of claim 2, wherein executing a secret key exchange further comprises:
- generating a first portion of the secret key at the vendor; and
- generating a second portion of the secret key at the secure printer.

8. The method of claim 2, further comprising:
- erasing the secret session key at the secure printer after the document has been printed.

9. The method of claim 1, wherein the certificate issued by the printer authority for the secure printer is included with the request for printing the document, and obtaining a certificate issued by the printer authority for the secure printer further comprises:
- retrieving the certificate from the request for printing the document.

10. The method of claim 1, wherein obtaining a certificate issued by the printer authority for the secure printer further comprises:
- retrieving the certificate for the secure printer from a certificate database based on the identification of the secure printer.

11. The method of claim 1, wherein if the certificate for the secure printer does not verify, the method further comprises:
- returning an error message to the workstation via the network indicating the secure printer is not authorized to print the document.

12. The method of claim 1, wherein creating a secure communication channel further comprises:
- generating, at the secure printer, a challenge value; and
- sending the challenge value from the secure printer to the vendor,
- wherein the challenge value is required to be included with at least one subsequent message sent from the vendor to the secure printer.

13. The method of claim 1, wherein the certificate issued by the printer authority for the vendor is included with the print request issued from the vendor to the secure printer, and obtaining a certificate issued by the printer authority for the vendor further comprises:
- retrieving the certificate from the print request issued from the vendor.

14. The method of claim 1, wherein obtaining a certificate issued by the printer authority for the vendor further comprises:
- retrieving the certificate for the vendor from a certificate database based on an identification of the vendor.

15. The method of claim 1, wherein if the certificate for the vendor does not verify, the method further comprises:
- returning an error message indicating the vendor is not authorized to have documents printed by the secure printer.

16. The method of claim 1, wherein issuing a print request from the vendor to the secure printer further comprises:
- combining the print request with a message from the printer authority that authorizes the vendor to have documents printed by the secure printer.

17. The method of claim 16, wherein verifying the certificate issued by the printer authority for the vendor further comprises:
- confirming that the message from the printer authority that authorizes the vendor to have documents printed by the secure printer is included with the print request issued from the vendor to the secure printer.

18. The method of claim 1, wherein the document is a value document that evidences a transaction that occurred between the vendor and a customer.

19. The method of claim 1, wherein the document is a ticket, receipt or gift certificate.

20. A method for a secure printer to print a document comprising:
- receiving a print request from a vendor to print the document, the print request including an identification of the vendor, the vendor being one of a plurality of vendors authorized by a printer authority to utilize the secure printer to print documents;

obtaining, by the secure printer, a certificate issued by the printer authority for the vendor;

verify, by the secure printer, in the certificate issued by the printer authority for the vendor;

if the certificate for the vendor verifies, creating a secure communication channel with the vendor;

receiving the document via the secure communication channel; and printing the document.

21. The method of claim 20, wherein creating a secure communication channel further comprises:

executing a secret key exchange with the vendor to generate a secret session key.

22. The method of claim 21, wherein the document is encrypted by the vendor using the secret session key, and printing the document further comprises:

decrypting the document using the secret session key.

23. The method of claim 20, wherein creating a secure communication channel further comprises:

generating a challenge value; and sending the challenge value to the vendor, wherein the challenge value is required to be included with at least one subsequent message sent from the vendor to the secure printer.

24. A system for printing a document generated by a vendor comprising:

a workstation including a secure printer, the workstation being accessed by a customer to conduct a transaction with the vendor via a network, the document to be printed being based on the transaction; and a printer authority, the printer authority issuing a certificate for the secure printer and the vendor, the certificate for the secure printer including an identification of the secure printer, the certificate for the vendor including an identification of the vendor;

wherein the workstation is adapted to request the document for printing on the secure printer, the request including an identification of the secure printer, the vendor obtains and verifies the certificate issued by the printer authority for the secure printer and upon successful verification of the certificate issues a print request to the secure printer via the network, the secure printer is adapted to obtain and verify the certificate issued by the printer authority for the vendor in response to the print request issued from the vendor and, if the certificate for the vendor verifies, execute a secret key exchange with the vendor to generate a secret session key, the vendor uses the secret session key to encrypt the document and sends the encrypted document to the secure printer, and the secure printer uses the secret session key to decrypt the document and prints the document.

25. The system of claim 24, further comprising a certificate database in which the certificates for the secure printer and vendor issued by the printer authority are maintained.

26. The system of claim 24, wherein the secure printer is further adapted to generate a challenge value and send the challenge value to the vendor, the challenge value being required to be included with at least one subsequent message sent from the vendor to the secure printer.

27. The system of claim 24, wherein the secret session key is erased from the secure printer after the document is printed.

28. The system of claim 24, wherein the document is a value document that evidences the transaction that occurred between the vendor and the customer.

29. The system of claim 28, wherein the value document is a ticket, receipt or gift certificate.

\* \* \* \* \*